US008416881B1

United States Patent
Jia et al.

(10) Patent No.: US 8,416,881 B1
(45) Date of Patent: Apr. 9, 2013

(54) EFFECTIVE SIGNAL INTERFERENCE PLUS NOISE RATIO ESTIMATION FOR MULTI-ORDER MODULATION

(75) Inventors: Ming Jia, Ottawa (CA); Jianglei Ma, Kanata (CA); Peiying Zhu, Kanata (CA); Wen Tong, Ottawa (CA)

(73) Assignee: Apple Inc., Cupertion, CA (US)

( * ) Notice: Subject to any disclaimer, the term of this patent is extended or adjusted under 35 U.S.C. 154(b) by 987 days.

(21) Appl. No.: 12/409,128

(22) Filed: Mar. 23, 2009

Related U.S. Application Data

(60) Provisional application No. 61/038,569, filed on Mar. 21, 2008.

(51) Int. Cl.
- H04K 1/02 (2006.01)
- H04K 1/10 (2006.01)
- H04L 27/00 (2006.01)
- H04L 27/28 (2006.01)
- H04B 15/00 (2006.01)

(52) U.S. Cl.
USPC ............ 375/296; 375/295; 375/260; 375/285

(58) Field of Classification Search .................. 375/130, 375/260, 295
See application file for complete search history.

(56) References Cited

U.S. PATENT DOCUMENTS

2004/0219883 A1* 11/2004 Pauli et al. ................. 455/67.11
2007/0177655 A1*  8/2007 Ktenas et al. ................. 375/144

* cited by examiner

Primary Examiner — Kenneth Lam
Assistant Examiner — Ross Varndell
(74) Attorney, Agent, or Firm — Meyertons, Hood, Kivlin, Kowert & Goetzel,, P.C.; Stephen J. Curran

(57) ABSTRACT

A method for determining an effective signal-to-interference-plus-noise ratio (ESINR) associated with transmission of modulation symbols at a plurality of different modulation orders. A signal-to-interference-plus-noise ratio bit factor (SBF) is determined for each of Q number of bits per symbol associated with a first modulation order based on a signal-to-interference-plus-noise ratio (SNR) associated with a base symbol associated with a base modulation order. A SBF is determined for each of P number of bits per symbol associated with a second modulation order based on the SNR associated with the base symbol. The first modulation order is different from the second modulation order. An ESINR of a first modulation symbol associated with the first modulation order and a second modulation symbol associated with the second modulation order is determined.

15 Claims, 7 Drawing Sheets

EFFECTIVE SIGNAL INTERFERENCE PLUS NOISE RATIO ESTIMATION FOR MULTI-ORDER MODULATION

This application claims the benefit of U.S. provisional patent application Ser. No. 61/038,569, filed Mar. 21, 2008, the disclosure of which is hereby incorporated herein by reference in its entirety.

FIELD OF THE INVENTION

This invention relates to determining an effective signal interference plus noise ratio estimation associated with the transmission of data, and in particular to determining an effective signal interference plus noise ratio estimation associated with the transmission of data transmitted at multiple modulation orders.

BACKGROUND OF THE INVENTION

In certain technologies, such as orthogonal frequency division multiplexing (OFDM), a communications channel between two devices is implemented through multiple subcarriers. Each subcarrier of a channel may have a different signal-to-interference-plus-noise ratio (SNR) associated with the subcarrier at a particular instant in time. Methodologies have been introduced that map the instantaneous SNR of multiple subcarriers into an effective channel SNR associated with the channel. The effective channel SNR can be used, for example, to determine a block-error probability (BLEP) for a given particular channel state. The BLEP may be used to determine an appropriate modulation and coding scheme (MCS) for use on the channel to optimize throughput of the channel. Determining an effective channel SNR is also useful in system level simulations.

It is common today to code information bits with forward error correction bits and send the data in a forward error correction (FEC) block. The effects of noise and interference may prevent a receiver from decoding an FEC block. Thus, it is necessary to periodically retransmit a FEC block. The retransmitted FEC block may be combined with the original FEC block, and if the combined FEC block cannot be properly decoded, additional FEC blocks will be requested until the FEC block can be decoded. Some retransmission technologies, such as Adaptive Hybrid Automatic Repeat Request (A-HARQ) for example, allow the modulation order of a retransmitted FEC block to differ from the modulation order used to transmit the original FEC block. It may be desirable for the transmitter to send the retransmitted FEC block at a particular SNR to increase the likelihood that the combined FEC block can be decoded. Thus, it would be helpful to determine an effective channel SNR associated with the transmission of two FEC blocks of data at different modulation orders. However, the known methodologies for determining an effective channel SNR cannot determine an effective channel SNR associated with transmissions at different modulation orders. With increased interest in the use of A-HARQ for emerging telecommunication technologies, there is a need for a mechanism for determining an effective channel SNR associated with data transmitted at different modulation orders.

SUMMARY OF THE INVENTION

The present invention determines an effective signal-to-interference-plus-noise ratio (ESINR) associated with the transmission of modulation symbols at different modulation orders. The transmissions can be separate transmissions that are combined together, such as in Adaptive Hybrid Automatic Repeat Request (A-HARQ) retransmissions of forward error correction (FEC) blocks, or the transmissions can be a single transmission of a single data block using different modulation orders, such as spatial multiplexing in a multiple-input and multiple-output (MIMO) transmission.

A base modulation is determined, such as a binary phase shift keying modulation, which is associated with a base modulation order, such as one. A normalization factor is determined to normalize the soft-bit energy of a bit represented by a modulation symbol of the base modulation order to determine a base modulation symbol signal-to-interference-plus-noise ratio (SNR). A SNR bit factor (SBF) for each of Q number of bits per symbol associated with a second modulation order that is different from the base modulation order, such as a binary phase shift keying modulation order, is determined. The SBF is determined based on the soft-bit energy associated with bits represented by modulation symbols of the second modulation order, and through normalization of the soft-bit energy via the normalization factor. SBFs may be determined for multiple different modulation orders. An ESINR can be calculated using the SBFs of the modulation orders by which the different modulation symbols were modulated. The calculated ESINR is in terms of a base modulation symbol SNR, and may be used in system level simulations to determine block error probabilities, for example. The ESINR may be used in A-HARQ to determine an appropriate modulation and coding scheme for a retransmission of an FEC block.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 5:
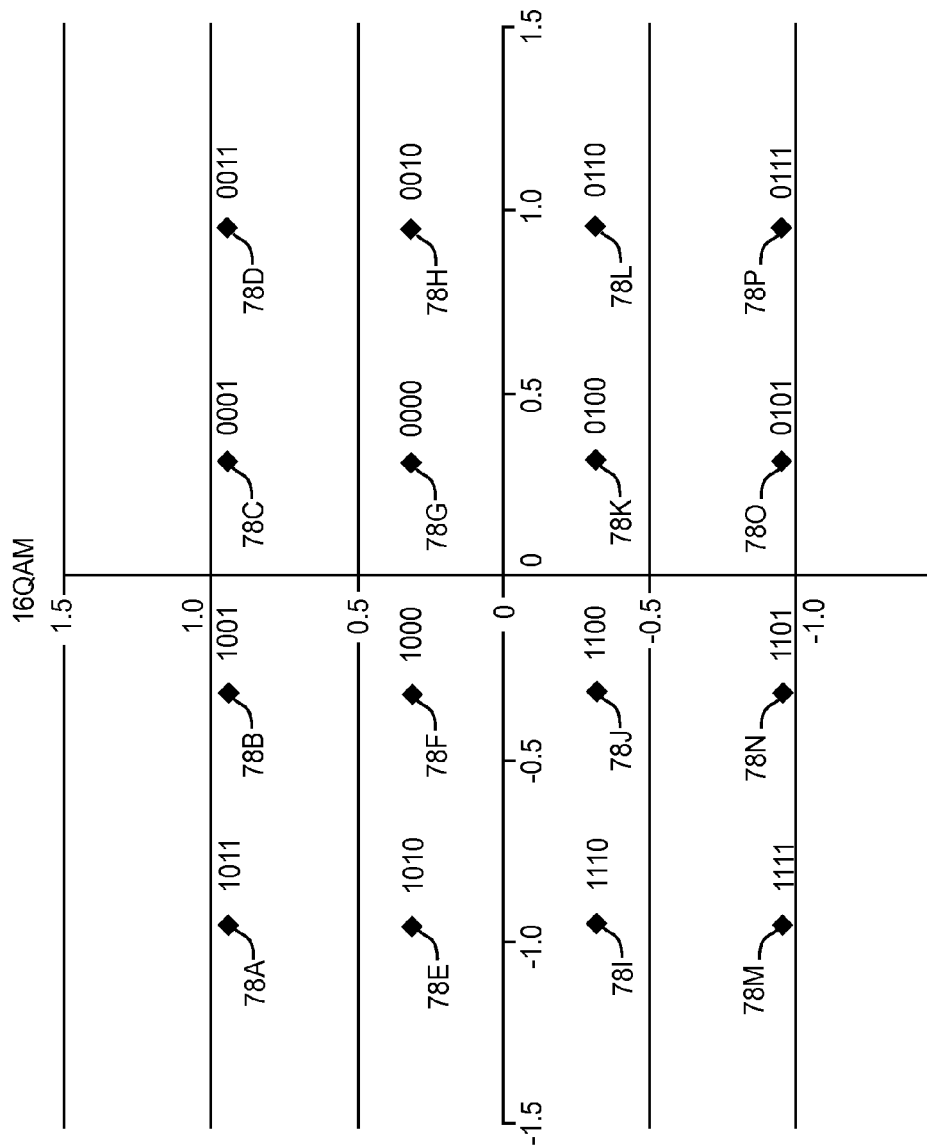
Figure 6:
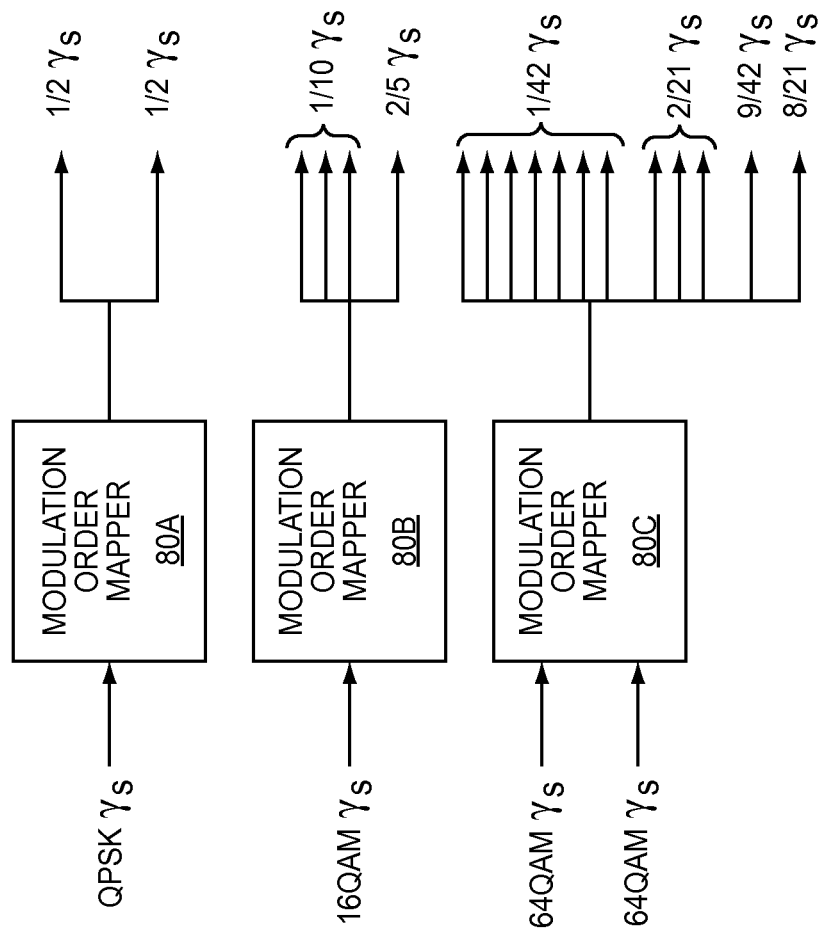
Figure 7:
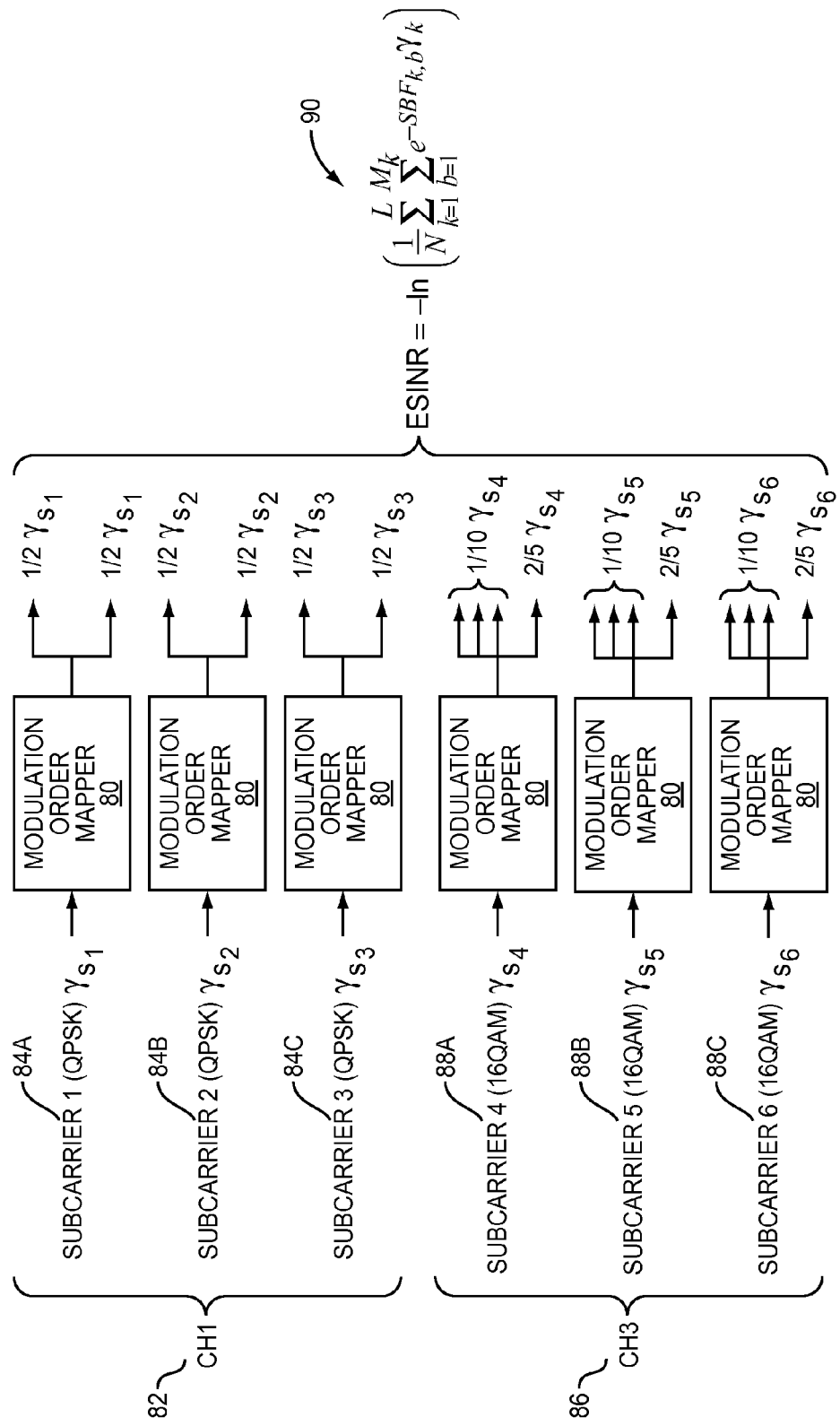

FIG. 5 is a constellation diagram associated with a 16-quadrature amplitude modulation (16QAM) modulation order FIG. 6 is a block diagram illustrating a mapping of modulation symbol signal-to-interference-plus-noise ratios (SNRs) to base modulation symbol SNRs according to one embodiment of the invention; and FIG. 7 is a block diagram illustrating a modulation order mapping in accordance with one embodiment of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to determining an effective signal to interference plus noise ratio (ESINR) associated with transmission of modulation symbols at different modulation orders. The present invention can be used in system level simulation, or by a scheduler in a base station, for example, to determine a particular modulation and coding scheme (MCS) for use in the retransmission of a forward error correction (FEC) block to determine an ESINR associated with the combined transmissions of an FEC block at different modulation orders.

As used throughout the specification, the phrase "modulation order" will refer to a modulation technique by the number of different symbols that can be transmitted by the modulation technique. For example, the binary phase shift keying (BPSK) modulation technique has an order of two because two different symbols can be transmitted using BPSK. As another example, the 16-quadrature amplitude modulation (16QAM) technique has an order of sixteen because sixteen different symbols can be transmitted using 16QAM.

Figure 1:
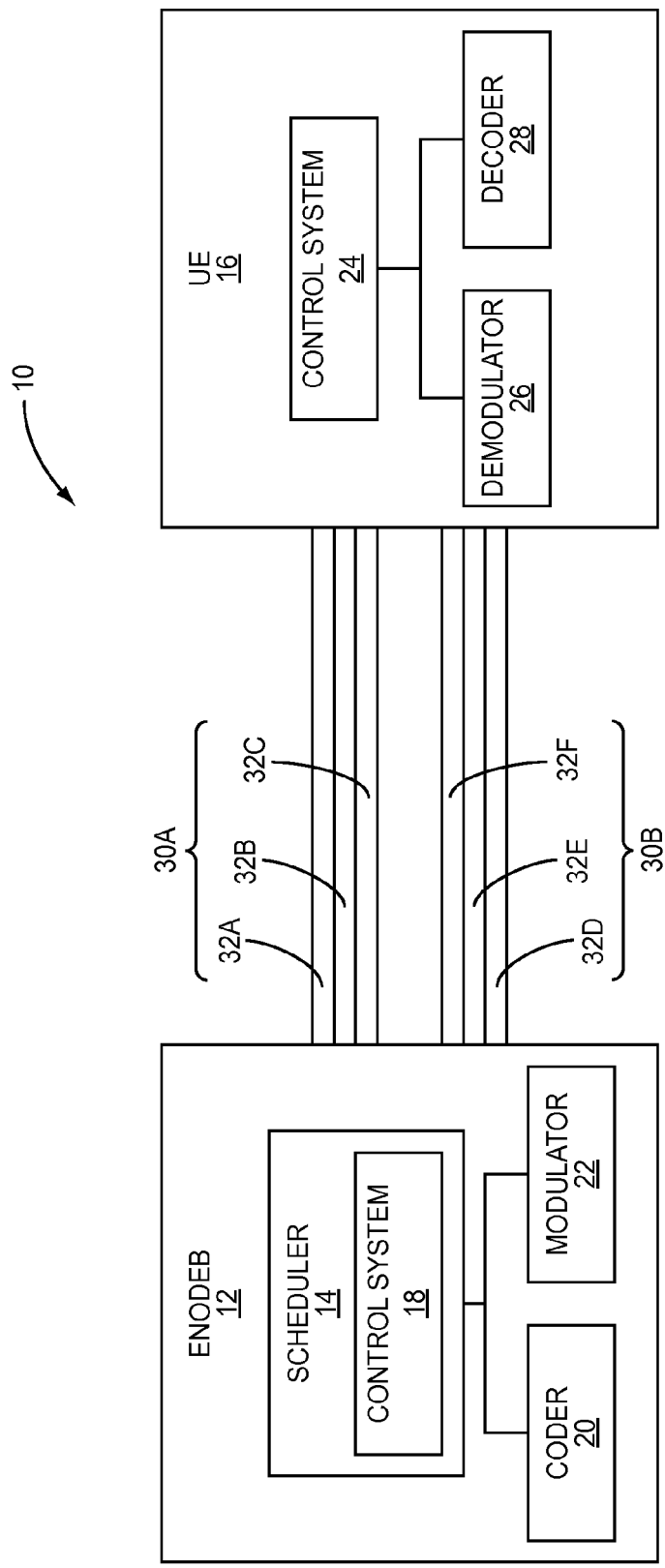
FIG. 1 is a block diagram illustrating subcarriers in an orthogonal frequency division multiplexing (OFDM) transmission system.

FIG. 1 is a block diagram illustrating subcarriers in an orthogonal frequency division multiplexing (OFDM) transmission system 10. A base station, such as a Long Term Evolution (LTE) enhanced Node B (eNodeB) 12, includes a scheduler 14 adapted to determine a particular MCS for use in a transmission of data to a receiver, such as a user equipment (UE) 16. The scheduler 14 can have a control system 18 including hardware and software suitable for carrying out the operations of the scheduler 14, and can be coupled to a coder 20 and a modulator 22 suitable for coding and modulation operations. The UE 16 also has a control system 24 which may include a combination of hardware and software for implementing a variety of functionality in the UE 16, which may comprise, for example, a cellular phone. The UE 16 includes a demodulator 26 and a decoder 28 for demodulating and decoding data transmitted by the eNodeB 12 to the UE 16. Although not shown, it will be appreciated that the eNodeB 12 also has a demodulator and decoder for processing data sent to the eNodeB 12 by the UE 16 and that the UE 16 similarly has a modulator and coder for use in providing data to the eNodeB 12. Modulation and coding techniques are well known to those skilled in the art and will not be discussed herein.

The eNodeB 12 may have a plurality of different channels 30A, 30B from which to choose to send data to the UE 16. Each channel 30A, 30B is made up of multiple subcarriers 32. For example, the channel 30A is made up of subcarriers 32A-32C, and the channel 30B is made up of subcarriers 32D-32F. Each subcarrier 32 may have a different signal-to-interference-plus-noise ratio (SNR) associated with it. Because the SNR is not flat across the subcarriers 32, a process has been developed, referred to herein as an Effective SIR Mapping (ESM) process, that maps the SNRs associated with the subcarriers 32 that compose a channel 30 to an instantaneous ESINR associated with the respective channel 30. The ESM process is described in detail in "System-level evaluation of OFDM—further considerations," R1-031303, RAN WG1 #35, the entirety of which is hereby incorporated herein by reference. The SNR associated with a subcarrier 32 differs based on the modulation order used on the subcarrier 32. The ESM process proposes the following equation for determining the ESINR on a channel 30 using BPSK modulation over multiple subcarriers 32:

$$\gamma_{\mathit{eff}} = -\ln\left(\frac{1}{N}\sum_{k=1}^{N} e^{-\gamma_k}\right),$$

where $\gamma_{\mathit{eff}}$ is the ESINR associated with the channel 30, N is the number of subcarriers 32, and $\gamma_k$ is the SNR on each subcarrier 32.

For higher order modulations, the ESM process proposes the use of the following generalized formula:

$$\gamma_{\mathit{eff}} = -\beta\ln\left(\frac{1}{N}\sum_{i=1}^{N} e^{\frac{\gamma_i}{\beta}}\right),$$

where $\beta$ is an experimentally derived value based on a particular MCS. Thus, the ESM process requires a different $\beta$ for each different MCS, and fails to address the determination of a single ESINR associated with the transmission of data over subcarriers 32 using different modulation orders.

Figure 2:
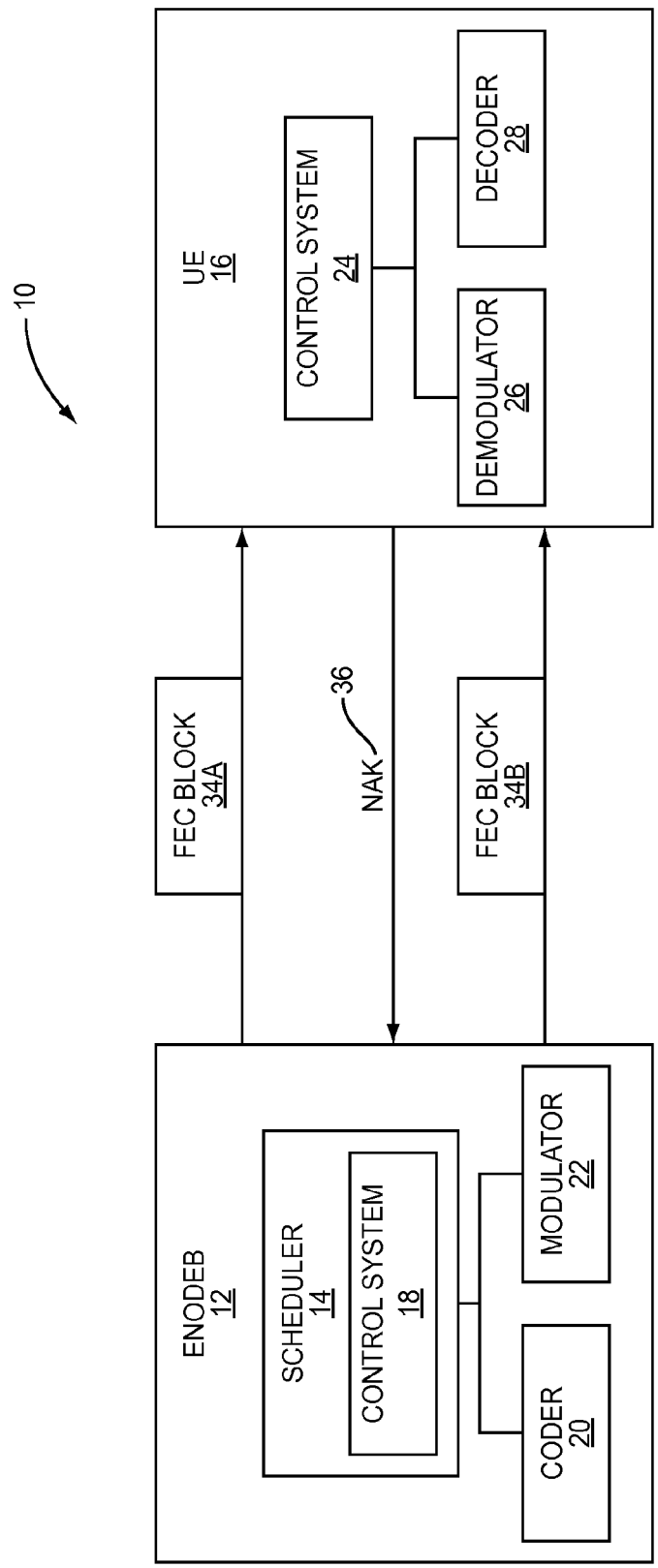
FIG. 2 is a block diagram illustrating particular data transmissions in the system illustrated in FIG. 1.

FIG. 2 is a block diagram illustrating exemplary data transmissions in the system 10 illustrated in FIG. 1. The eNodeB 12 transmits a FEC block 34A to the UE 16. By FEC block, it is meant that a combination of information bits and FEC bits are transmitted as a block of data, as is understood by those skilled in the art. The FEC block 34A is transmitted by the eNodeB 12 using 16QAM modulation. Assume that the decoder 28 is unable to decode the FEC block 34A and the UE 16 sends a NAK 36 to the eNodeB 12 to indicate that the FEC block 34A should be retransmitted. Assume further that the eNodeB 12 uses an Adaptive Hybrid Automatic Repeat Request (A-HARQ) process for retransmitting FEC blocks. A-HARQ is known to those skilled in the art and will not be described in detail herein, other than to note that FEC blocks retransmitted using A-HARQ are frequently combined with previously transmitted FEC blocks in order to increase the likelihood of successful decoding of the FEC block.

Using A-HARQ, the eNodeB 12 may send an FEC block 34B, which is a retransmission of the information bits in the FEC block 34A with additional error correction bits, using a different MCS than the eNodeB 12 used to transmit the FEC block 34A. However, the eNodeB 12 may want to ensure that the FEC block 34B is sent at a certain MCS that will result in a particular block error probability (BLEP) for the combined transmissions of the FEC block 34A and the FEC block 34B so that the combined transmissions are likely to be properly decoded by the decoder 28. In order for the eNodeB 12 to determine a BLEP associated with the combined transmissions of the FEC block 34A and the FEC block 34B, the eNodeB 12 may determine a combined ESINR associated with the transmissions of both FEC blocks 34A, 34B. However, the ESM process described previously provides no mechanism for determining an ESINR associated with the transmission of data at different modulation orders.

The present invention provides a modulation order mapper that enables the determination of an ESINR associated with the transmission of data at different modulation orders. While described above in terms of A-HARQ retransmissions in an OFDM system, the ability to determine an ESINR associated with the transmission of data using different modulation orders may be useful in a wide variety of situations, such as during system level simulations. Moreover, while the discussion herein will, for the purposes of illustration, associate a modulation symbol SNR with a particular subcarrier in an OFDM system, the principles herein are not limited to determining an ESINR from different modulation orders from different subcarriers, but rather can be used on a modulation symbol by modulation symbol basis, such as for use in a technology that enables different modulation orders to be used to transmit data within the same FEC block.

Figure 3:
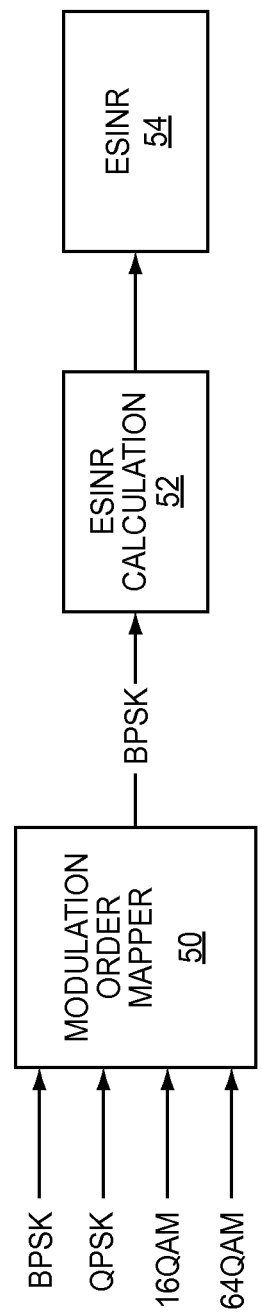
FIG. 3 is a high-level block diagram of a modulation order mapper according to one embodiment of the invention.

FIG. 3 is a high-level block diagram of a modulation order mapper 50 according to one embodiment of the invention. The modulation order mapper 50 maps the modulation symbol SNR associated with symbols of different modulation orders to a BPSK modulation symbol SNR such that an ESINR calculation 52 can determine an ESINR 54 associated with data transmitted at different modulation orders.

The present invention, as described herein, uses the soft-bit energy associated with bits in a modulation symbol to determine a SNR bit factor (SBF) for each bit of a respective modulation symbol. The SBF is then used to map the modulation symbol SNR of a respective modulation symbol to a BPSK modulation symbol SNR. Once all modulation symbol SNRs are mapped to the BPSK modulation symbol SNR, the ESINR can be calculated. According to one embodiment of the invention, a SNR ratio per bit for BPSK modulation is determined based on the soft-bit energy associated with a BPSK symbol. The soft-bit energy associated with a bit of a modulation symbol may be determined by log likelihood ratio (LLR) principles. LLR concepts are known to those skilled in the art and will not be described in detail herein. When demodulating in an equalized domain, an LLR calculation can be simplified to the following equation:

$$L(b) = -\gamma_{symbol}\left(\min_{s \in S_0}((x-s_x)^2 + (y-s_y)^2) - \min_{s \in S_1}((x-s_x)^2 + (y-s_y)^2)\right),$$

where $\gamma_{symbol}$ is the SNR of the received QAM symbol, x is the real part of a QAM signal being transmitted, y is the imaginary part of the QAM signal being transmitted, $S_0$ is the constellation set that has b=0, and $S_1$ is the constellation set that has b=1. Assuming no noise in the signal, L(b) equals the square of the minimum distance between the constellation point and the two constellation sets $S_0$ or $S_1$, (depending on whether the bit under consideration has a value of '1' or '0'), weighted by $\gamma_{symbol}$, which can be treated as the received bit energy. While the present invention used a Max-Log soft-demapping algorithm to determine the soft-bit energy associated with the modulation symbol bits as described herein, the invention is not limited to any particular soft-demapping algorithm.

Note that for BPSK symbol modulation, a single bit, b(i), is mapped to a complex-valued modulation symbol x=I+jQ according to Table 1.

TABLE 1

| b(i) | I | Q |
|------|---|---|
| 0 | $1/\sqrt{2}$ | $1/\sqrt{2}$ |
| 1 | $-1/\sqrt{2}$ | $-1/\sqrt{2}$ |

Again, assuming no noise, the demapped soft-bit energy can be determined from the square of the minimum distance between the two constellation sets $S_0$ and $S_1$. The square of the minimum distance between each of the constellation sets in a BPSK symbol equals 4, and thus:

$E_{BPSK, soft-bit} = 4$

Note that for either BPSK constellation point, $I^2+Q^2=1$, e.g., $(1/\sqrt{1})^2+(1/\sqrt{2})^2=1$), and thus the energy associated with a BPSK constellation point equals 1. By defining a normalization variable $\theta=4$, the per-bit SNR (frequently represented herein by the Greek symbol gamma, i.e., γ) is normalized back to the BPSK symbol SNR, such that $\gamma_{BPSK, per-bit} = \gamma_{BPSK, symbol}$, as illustrated in the following equation:

$$\gamma_{BPSK,per-bit} = \frac{E_{BPSK,soft-bit}}{\theta}\gamma_{BPSK,symbol} = \gamma_{BPSK,symbol}.$$

The normalization variable $\theta$ will be used, as described herein, to normalize soft-demapped bits from high-order QAMs, so that such soft-demapped bits will appear as a series of BPSK modulation symbols. By mapping different modulation symbol SNRs to a base modulation symbol SNR, an ESINR in terms of the base modulation can be determined from symbols associated with multiple modulation orders. The ESINR can be used, for example, to determine a block error rate performance from an additive white Gaussian noise (AWGN) curve that is based on the base modulation order.

A SBF is then determined for each of the Q bits that are represented by a respective modulation symbol. For example, Q=2 for quadrature phase shift keying (QPSK) modulation, and a SBF will be determined for each of the two bits that may be represented by a QPSK modulation symbol. For 16QAM modulation, Q=4, and a SBF will be determined for each of the four bits that may be represented by a 16QAM modulation symbol. The SBFs associated with a respective modulation order can then be applied, as described herein, to the SNR associated with a respective modulation symbol of the same modulation order to map the modulation symbol SNR to the BPSK modulation order SNR for use in determining an ESINR. Examples for determining SBFs associated with QPSK and 16QAM will be described herein, and such examples will enable those skilled in the art to determine SBFs associated with higher order modulations.

Figure 4:
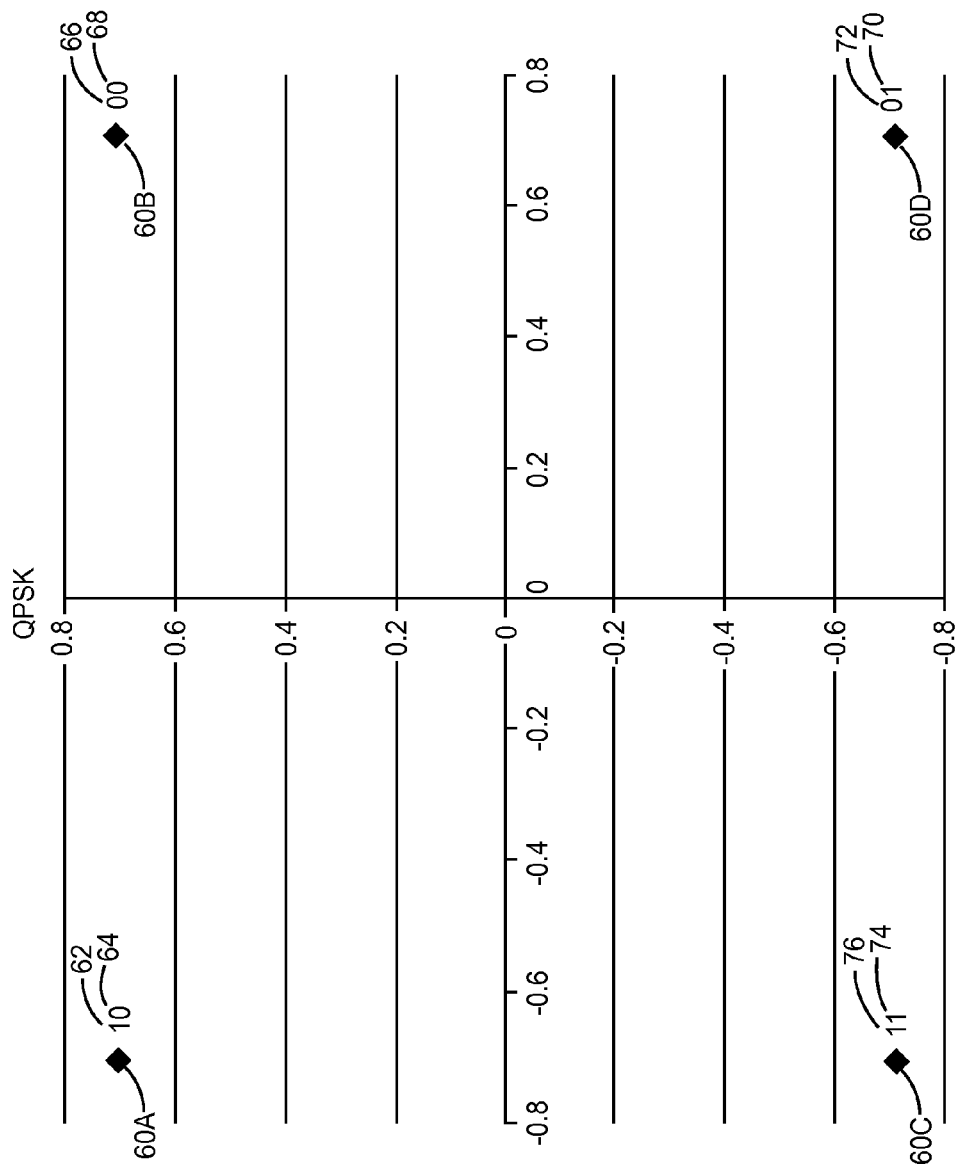
FIG. 4 is a constellation diagram associated with a quadrature phase shift keying (QPSK) modulation order.

FIG. 4 is a constellation diagram associated with a QPSK modulation order. The pairs of bits that may be represented by a particular QPSK modulation symbol are shown in FIG. 4 as constellation points 60A-60D, and are referred to in Table 2 as b(i) and b(i+1). The pairs of bits b(i) and b(i+1) are mapped to a complex-valued modulation symbol x=I+jQ according to Table 2.

TABLE 2

| b(i), b(i+1) | I | Q |
|--------------|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

In order to determine a SBF for each of the Q=2 bits associated with a QPSK modulation symbol, the soft-bit energy associated with each bit of each constellation point 60A-60D is determined. In the example of QPSK modulation, there are a total of eight bits (i.e., two bits for each constellation point 60, and four constellation points 60A-60D). The soft-bit energy for each bit is determined by the square of the minimum distance between the constellation point 60 associated with the respective bit, and the closest constellation point 60 wherein the same bit position (e.g., b(i) or b(i+1)) has a different value than the respective bit. For example, to determine the soft-bit energy associated with bit 64 in the constellation point 60A, the closest constellation point 60 having a bit in the same bit position of the bit 64 (i.e., b(i+1)) is determined. Notably bit 68 at the b(i+1) position in the constellation point 60B has the same value, '0', as the bit 64. However, bit 70 and bit 74 in constellation points 60D and 60C, respectively, each have a value that is different from bit 64. It should be apparent that the constellation point 60C is closer to the constellation point 60A than the constellation point 60D. Thus, the soft-bit energy of the respective bit 64 can be calculated as the square of the minimum distance between the constellation point 60A and the constellation point 60C is determined according to the following equation:

$$E_{bit} = (I_2 - I_1)^2 + (Q_2 - Q_1)^2 \quad (1)$$

$$E_{bit} = \left(-\frac{1}{\sqrt{2}} - \left(-\frac{1}{\sqrt{2}}\right)\right)^2 + \left(-\frac{1}{\sqrt{2}} - \frac{1}{\sqrt{2}}\right)^2 \quad (2)$$

$$E_{bit} = 2.$$

While not expressly illustrated herein, notably, the soft-bit energy for each of the bits 62-76 is two in accordance with the above equation. Thus, for any bit in any constellation point 60 associated with the QPSK modulation order, the soft-bit energy is 2. Soft-bit energies are then assigned to each of the Q bits associated with a modulation symbol in proportion to the occurrence of the soft-bit energies among the total of all bits of all constellation points. Since, in the example of QPSK, each of the eight total bits of all constellation points have a soft-bit energy of 2, each of the Q=2 bits will be assigned a soft-bit energy of 2.

The SBF of each of the Q=2 bits is then determined by normalizing the SNR of the soft demapped energy to the SNR of the BPSK symbol, according to the following equation:

$$\gamma_{QPSK,per-bit} = \frac{E_{QPSK,soft-bit}}{\beta} \gamma_{QPSK,symbol} \quad (1)$$

$$SBF = \frac{1}{2}\gamma_{QPSK,symbol}.$$

Such normalization makes each QPSK bit equivalent to a BPSK symbol, e.g., each QPSK symbol can be viewed as two separate BPSK symbols, with each BPSK symbol having an SNR of $\frac{1}{2}\gamma_{QPSK,symbol}$.

FIG. 5 is a constellation diagram associated with a 16QAM modulation order. In 16QAM modulation, Q=4 because each 16QAM modulation symbol can represent four bits. The 16 different sequences of bits that may be represented by a particular 16QAM modulation symbol are shown in FIG. 5 as constellation points 78A-78P. The sequence of bits b(i), b(i+1), b(i+2), and b(i+3) are mapped to a complex-valued modulation symbol x=I+jQ according to Table 3.

TABLE 3

| b(i), b(i + 1), b(i + 2), b(i + 3) | I | Q |
| --- | --- | --- |
| 0000 | 1/√10 | 1/√10 |
| 0001 | 1/√10 | 3/√10 |
| 0010 | 3/√10 | 1/√10 |
| 0011 | 3/√10 | 3/√10 |
| 0100 | 1/√10 | −1/√10 |

TABLE 3-continued

| b(i), b(i + 1), b(i + 2), b(i + 3) | I | Q |
| --- | --- | --- |
| 0101 | 1/√10 | −3/√10 |
| 0110 | 3/√10 | −1/√10 |
| 0111 | 3/√10 | −3/√10 |
| 1000 | −1/√10 | 1/√10 |
| 1001 | −1/√10 | 3/√10 |
| 1010 | −3/√10 | 1/√10 |
| 1011 | −3/√10 | 3/√10 |
| 1100 | −1/√10 | −1/√10 |
| 1101 | −1/√10 | −3/√10 |
| 1110 | −3/√10 | −1/√10 |
| 1111 | −3/√10 | −3/√10 |

In order to determine a SBF for each of the Q=4 bits associated with a 16QAM modulation symbol, the soft-bit energy associated with each bit of each constellation point 78A-78P is determined. There are a total of 64 bits (i.e., four bits for each constellation point 78, and 16 constellation points 78A-78P). The soft-bit energy for each bit is determined by the square of the minimum distance between the constellation point 78 associated with the respective bit, and the closest constellation point 78 wherein the same bit position (e.g., b(i), b(i+1), b(i+2), or b(i+3)) has a different value than the respective bit, as described above with respect to determining the soft-bit energies of each bit in each QPSK constellation point.

Determining the soft-bit energies for each of the 64 bits in accordance with formula 1, above, results in 48 of the 64 bits having a soft-bit energy of ⅖ and 16 of the 64 bits having a soft-bit energy of ⅘. Thus, ¾ of the 64 bits have a soft-bit energy of ⅖ and ¼ of the 64 bits have a soft-bit energy of 8;5. Consequently, ¾ of the L=4 bits are assigned a soft-bit energy of ⅖ and ¼ of the L=4 bits are assigned a soft-bit energy of ⅘, because in any four-bit sequence associated with a 16QAM modulation symbol, the probability is that ¾ of the bits (i.e., three of the four bits), will have a soft-bit energy of ⅖ and ¼ of the bits (i.e., one of the four bits) will have a soft-bit energy of ⅘.

The SBF of each of the Q=4 bits is determined by normalizing the SNR of the soft demapped energy of each of the Q=4 16QAM bits to the SNR of the BPSK symbol, according to the following equation:

$$\gamma_{16QAM,per-bit} = \frac{E_{16QAM,soft-bit}}{\beta}\gamma_{16QAM,symbol}$$

$$(3\text{bits}) = SBF = \frac{1}{10}\gamma_{16QAM,symbol}$$

$$(1\text{bit}) = SBF = \frac{2}{5}\gamma_{16QAM,symbol}.$$

For 64QAM modulation, Q=6 because each 64QAM modulation symbol can represent six bits. The sequence of bits b(i), b(i+1), b(i+2), b(i+3), b(i+4) and b(i+5) are mapped to a complex-valued modulation symbol x=I+jQ according to Table 4.

TABLE 4

| b(i), b(i + 1), b(i + 2), b(i + 3), b(i + 4), b(i + 5) | I | Q |
| --- | --- | --- |
| 000000 | 3/√42 | 3/√42 |
| 000001 | 3/√42 | 1/√42 |
| 000010 | 1/√42 | 3/√42 |
| 000011 | 1/√42 | 1/√42 |
| 000100 | 3/√42 | 5/√42 |

TABLE 4-continued

| b(i), b(i + 1), b(i + 2), b(i + 3), b(i + 4), b(i + 5) | I | Q |
|---|---|---|
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |
| 001110 | $7/\sqrt{42}$ | $5/\sqrt{42}$ |
| 001111 | $7/\sqrt{42}$ | $7/\sqrt{42}$ |
| 010000 | $3/\sqrt{42}$ | $-3/\sqrt{42}$ |
| 010001 | $3/\sqrt{42}$ | $-1/\sqrt{42}$ |
| 010010 | $1/\sqrt{42}$ | $-3/\sqrt{42}$ |
| 010011 | $1/\sqrt{42}$ | $-1/\sqrt{42}$ |
| 010100 | $3/\sqrt{42}$ | $-5/\sqrt{42}$ |
| 010101 | $3/\sqrt{42}$ | $-7/\sqrt{42}$ |
| 010110 | $1/\sqrt{42}$ | $-5/\sqrt{42}$ |
| 010111 | $1/\sqrt{42}$ | $-7/\sqrt{42}$ |
| 011000 | $5/\sqrt{42}$ | $-3/\sqrt{42}$ |
| 011001 | $5/\sqrt{42}$ | $-1/\sqrt{42}$ |
| 011010 | $7/\sqrt{42}$ | $-3/\sqrt{42}$ |
| 011011 | $7/\sqrt{42}$ | $-1/\sqrt{42}$ |
| 011100 | $5/\sqrt{42}$ | $-5/\sqrt{42}$ |
| 011101 | $5/\sqrt{42}$ | $-7/\sqrt{42}$ |
| 011110 | $7/\sqrt{42}$ | $-5/\sqrt{42}$ |
| 011111 | $7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $-3/\sqrt{42}$ | $-3/\sqrt{42}$ |
| 110001 | $-3/\sqrt{42}$ | $-1/\sqrt{42}$ |
| 110010 | $-1/\sqrt{42}$ | $-3/\sqrt{42}$ |
| 110011 | $-1/\sqrt{42}$ | $-1/\sqrt{42}$ |
| 110100 | $-3/\sqrt{42}$ | $-5/\sqrt{42}$ |
| 110101 | $-3/\sqrt{42}$ | $-7/\sqrt{42}$ |
| 110110 | $-1/\sqrt{42}$ | $-5/\sqrt{42}$ |
| 110111 | $-1/\sqrt{42}$ | $-7/\sqrt{42}$ |
| 111000 | $-5/\sqrt{42}$ | $-3/\sqrt{42}$ |
| 111001 | $-5/\sqrt{42}$ | $-1/\sqrt{42}$ |
| 111010 | $-7/\sqrt{42}$ | $-3/\sqrt{42}$ |
| 111011 | $-7/\sqrt{42}$ | $-1/\sqrt{42}$ |
| 111100 | $-5/\sqrt{42}$ | $-5/\sqrt{42}$ |
| 111101 | $-5/\sqrt{42}$ | $-7/\sqrt{42}$ |
| 111110 | $-7/\sqrt{42}$ | $-5/\sqrt{42}$ |
| 111111 | $-7/\sqrt{42}$ | $-7/\sqrt{42}$ |

In order to determine a SBF for each of the Q=6 bits associated with a 64QAM modulation symbol, the soft-bit energy associated with each bit of each constellation point is determined. There are a total of 384 bits (i.e., six bits for each of 64 constellation points). The soft-bit energy for each bit is determined by the square of the minimum distance between the constellation point associated with the respective bit, and the closest constellation point wherein the same bit position (e.g., b(i), b(i+1), b(i+2), b(i+3), b(i+4) b(i+5)) has a different value than the respective bit, as described above with respect to determining the soft-bit energies of each bit in each QPSK constellation point.

Determining the soft-bit energies for each of the 384 bits in accordance with formula 1, above, results in four separate soft-bit energies occurring in with the following probability, as shown in Table 5.

TABLE 5

| $E_{64\ QAM,\ soft-bit}$ | $2/21$ | $8/21$ | $18/21$ | $32/21$ |
|---|---|---|---|---|
| Probability | $7/12$ | $3/12$ | $1/12$ | $1/12$ |

Notably for every 12 64QAM modulated bits (i.e., every two 64QAM symbols), seven of the bits have a soft-bit energy of $2/21$, three of the bits have a soft-bit energy of $8/21$, one of the bits has a soft bit energy of $18/21$, and one of the bits has a soft-bit energy of $32/21$. Because Q=6 and the probability for certain soft-bit energies, for example soft bit energies of $18/21$ and $32/21$, have less than a $1/6$ probability of occurring in a 64QAM symbol, Q can be set to 12 and two 64QAM symbols can be demapped at the same time. If it is not feasible to demap two 64QAM symbols at the same time, the 64QAM symbol may be demapped individually but alternately assigned one of two SBF groups such that each of the six bits from a respective 64QAM symbol is assigned an SBF in accordance with one of the two SBF groups. One example of such grouping is:

$$\left\{\frac{1}{42}\gamma_s, \frac{1}{42}\gamma_s, \frac{1}{42}\gamma_s, \frac{1}{42}\gamma_s, \frac{2}{21}\gamma_s, \frac{8}{21}\gamma_s,\right\},$$

$$\left\{\frac{1}{42}\gamma_s, \frac{1}{42}\gamma_s, \frac{1}{42}\gamma_s, \frac{2}{21}\gamma_s, \frac{2}{21}\gamma_s, \frac{8}{21}\gamma_s,\right\}.$$

The SBF of each of the Q=12 bits can be determined by normalizing the SNR of the soft demapped energy of each of the Q=12 64QAM bits to the SNR of the BPSK symbol, according to the following equation:

$$\gamma_{64QAM,per-bit} = \frac{E_{64QAM,soft-bit}}{\beta}\gamma_{64QAM,symbol}$$

$$(7\ \text{bits}) = SBF = \frac{1}{42}\gamma_{64QAM,symbol}$$

$$(3\ \text{bits}) = SBF = \frac{2}{21}\gamma_{64QAM,symbol}$$

$$(1\ \text{bit}) = SBF = \frac{9}{42}\gamma_{64QAM,symbol}$$

$$(1\ \text{bit}) = SBF = \frac{8}{21}\gamma_{64QAM,symbol}.$$

FIG. 6 is a block diagram illustrating a mapping of modulation symbol SNRs to base modulation symbol SNRs according to one embodiment of the invention. A modulation order mapper 80A maps a QPSK modulation symbol SNR to two BPSK modulation symbol SNRs, each having a SBF of ½. A modulation order mapper 80B maps a 16QAM modulation symbol SNR to four BPSK modulation symbol SNRs, three of which have a SBF of $1/10$ and one of which has a SBF of $2/5$. A modulation order mapper 80C maps two 64QAM modulation symbol SNRs to 12 BPSK modulation symbol SNRs, seven of which have a SBF of $1/42$, three of which have a SBF of $2/21$, one of which has a SBF of $9/42$, and one of which has a SBF of $8/21$. While the modulation order mappers 80A-80C have been illustrated separately, it will be understood by one skilled in the art that the modulation order mappers 80A-80C could be implemented as a single modulation order mapper 80 if desired.

While SBFs have been illustrated throughout the specification in fractional form for purposes of illustration, it will be understood that the SBFs may be shown in any numeric form, such as decimal form, and that the actual value of the SBF may deviate from the value illustrated herein a certain amount if desired. For example, recall that a 16QAM modulation symbol SNR can be mapped to four BPSK modulation symbol SNRs, using SBFs of ⅖ and ⅘. Alternately, such SBFs could be expressed in decimal form as 0.40 and 1.6, respectively. Moreover, an SBF, such as the SBF 0.40, could be designated as any number in a range of numbers, such as, for example, a number in a range from about 0.30 to about 0.50, depending on a desired level of accuracy, without departing from the invention herein.

FIG. 7 is a block diagram illustrating a modulation order mapping in accordance with one embodiment of the invention. Assume that a system level simulation simulates the transmission of a first FEC block of data on a channel 82 having three subcarriers 84A-84C, each of which carries QPSK modulation symbols. Assume the first FEC block was not decoded properly, and a second FEC block containing the same information bits is transmitted using A-HARQ on a channel 86 having three subcarriers 88A-88C, each of which carries 16QAM modulation symbols. The modulation order mapper 80 maps each subcarrier channel 84A-84C QSPK symbol SNR into two BSPK symbol SNRs, each having an SBF of ½. The modulation order mapper 80 maps each subcarrier channel 88A-88C 16QAM symbol SNR into four BSPK symbol SNRs, three of which have an SBF of ¹⁄₁₀, and one of which has an SBF of ⅖. The ESINR can be calculated through the use of equation 90, wherein N is the total number of equivalent BPSK symbols (i.e., 18 in the example illustrated in FIG. 7), L is the number of subcarriers being demapped (e.g., six in the example illustrated in FIG. 7), $M_k$ is the number of bits in the modulation symbol (before mapping) associated with the $k^{th}$ subcarrier channel, $SBF_{k,b}$ is the SBF associated with the $b^{th}$ bit in the $k^{th}$ modulation symbol, and $\gamma_k$ is the SNR of the $k^{th}$ modulation symbol.

While the invention has been illustrated and discussed in the context of subcarriers, the invention is not limited to different modulations on different subcarriers and can be used in any context where it is desired to determine an ESINR associated with multiple modulation symbols of different modulation orders. The invention can be used, for example, to determine an ESINR of a single transmission containing multiple symbols of different modulation orders, such as may occur via the use of multiple-input and multiple-output (MIMO) technology. In such context, the ESINR may be calculated via the following equation:

$$ESINR = -\ln\left(\frac{1}{N}\sum_{k=1}^{L}\sum_{b=1}^{M_k} e^{-SBF_{k,b}\gamma_k}\right),$$

wherein N is the total number of BPSK equivalent symbols, L is the number of QAM symbols in the FEC block, $M_k$ is the number of bits in the $k^{th}$ QAM symbol, $SBF_{k,b}$ is the SBF associated with the $b^{th}$ bit in the $k^{th}$ QAM symbol, and $\gamma_k$ is the SNR of the $k^{th}$ QAM symbol.

While the invention has been described in the context of mapping higher modulation orders to a BPSK modulation order, those of skill in the art will recognize that other modulation orders, such as a QPSK modulation order, may be used as a base modulation order, if appropriate in the context of the respective application.

Those skilled in the art will recognize improvements and modifications to the preferred embodiments of the present invention. All such improvements and modifications are considered within the scope of the concepts disclosed herein and the claims that follow.

What is claimed is:

1. A method for determining an effective signal-to-interference-plus-noise ratio (ESINR) associated with transmission of a plurality of modulation symbols at a plurality of different modulation orders comprising:
   determining a signal-to-interference-plus-noise ratio (SNR) bit factor (SBF) for each of Q number of bits per symbol associated with a first modulation order based on the SNR associated with a base symbol associated with a base modulation order;
   determining a SBF for each of P number of bits per symbol associated with a second modulation order based on the SNR associated with the base symbol, wherein the first modulation order is different from the second modulation order; and
   determining an ESINR for a first modulation symbol associated with the first modulation order and a second modulation symbol associated with the second modulation order based on:
   a first SNR associated with the first modulation symbol,
   a second SNR associated with the second modulation symbol, and
   the SBF associated with each of the Q plus P number of bits per symbol;
   wherein determining the ESINR comprises determining the ESINR substantially in accordance with the following equation:

$$ESINR = -\ln\left(\frac{1}{N}\sum_{k=1}^{L}\sum_{b=1}^{M_k} e^{-SBF_{k,b}\gamma_k}\right),$$

wherein N is a total of the Q number of bits per symbol plus the P number of bits per symbol, L is a total number of modulation symbols for which an ESINR is being determined, $M_k$ is a number of bits in a respective modulation symbol L,
   $\gamma_k$ is the SNR associated with a respective modulation symbol L associated with a respective bit N, and SBF is the SBF associated with the respective bit N of the respective modulation symbol L.

2. The method of claim 1 wherein the base symbol is a binary phase shift keying symbol, and the base modulation order is 1.

3. The method of claim 1 wherein the base symbol is a quadrature phase shift keying symbol, and the base modulation order is 2.

4. The method of claim 1 wherein the first modulation order is a quadrature phase shift keying order and Q=2, and wherein determining the SBF for each of the Q number of bits per symbol associated with the first modulation order based on the SNR associated with the base symbol associated with the base modulation order comprises determining a first bit represented by the first modulation symbol has a SBF of about ½, and a second bit represented by the first modulation symbol has a SBF of about ½.

5. The method of claim 1 wherein the first modulation order is a 16-quadrature amplitude modulation order and Q=4, and wherein determining the SBF for each of the Q number of bits per symbol associated with the first modulation order based on the SNR associated with the base symbol associated with the base modulation order comprises determining a first bit of the Q number of bits per symbol has a SBF of about 1/10, a second bit of the Q number of bits per symbol has a SBF of about 1/10, a third bit of the Q number of bits per symbol has a SBF of about 1/10, and a fourth bit of the Q number of bits per symbol has a SBF of about 2/5.

6. The method of claim 1 wherein determining the SBF for each of the Q number of bits per symbol associated with the first modulation order based on the SNR associated with the base symbol associated with the base modulation order comprises:
   determining a soft-bit energy for each constellation bit associated with the first modulation order, and wherein the Q number of bits per symbol are assigned a first value equal to a soft-bit energy associated with a plurality of constellation bits in a same proportion as the occurrence of the soft-bit energy of the plurality of constellation bits; and
   normalizing each first value of the Q number of bits per symbol to the base modulation order based on a normalization factor applied to the SNR associated with the base symbol.

7. The method of claim 1 further comprising:
   determining a block error probability based on the ESINR; and
   transmitting the second modulation symbol at the second modulation order based on the block error probability.

8. The method of claim 1 wherein the first SNR is further associated with a first subcarrier associated with a first channel associated with a Long Term Evolution (LTE) enhanced node B base station.

9. A scheduler comprising:
   a communications interface adapted to interface with a modulator; and
   a control system coupled to the modulator and adapted to:
      determine a signal-to-interference-plus-noise ratio (SNR) bit factor (SBF) for each of Q number of bits per symbol associated with a first modulation order based on the SNR associated with a base symbol associated with a base modulation order;
      determine a SBF for each of P number of bits per symbol associated with a second modulation order based on the SNR associated with the base symbol, wherein the first modulation order is different from the second modulation order; and
      determine an effective signal-to-interference-plus-noise ratio (ESINR) for a first modulation symbol associated with the first modulation order and a second modulation symbol associated with the second modulation order based on a first SNR associated with the first modulation symbol, a second SNR associated with the second modulation symbol, and the SBF associated with each of the Q plus P number of bits per symbol;
      wherein to determine the ESINR, the control system is further adapted to determine the ESINR substantially in accordance with the following equation:

$$ESINR = -\ln\left(\frac{1}{N}\sum_{k=1}^{L}\sum_{b=1}^{M_k} e^{-SBF_{k,b}\gamma_k}\right),$$

wherein N is a total of the Q number of bits per symbol plus the P number of bits per symbol, L is a total number of modulation symbols for which an ESINR is being determined $M_k$ is a number of bits in a respective modulation symbol L, $\gamma_k$ is the SNR associated with a respective modulation symbol L associated with a respective bit N, and SBF is the SBF associated with the respective bit N of the respective modulation symbol L.

10. The scheduler of claim 9 wherein the first modulation order is a quadrature phase shift keying order and Q=2, and wherein to determine the SBF for each of the Q number of bits per symbol associated with the first modulation order based on the SNR associated with the base symbol associated with the base modulation order, the control system is further adapted to determine a first bit represented by the first modulation symbol has a SBF of about 1/2, and a second bit represented by the first modulation symbol has a SBF of about 1/2.

11. The scheduler of claim 9 wherein the first modulation order is a 16-quadrature amplitude modulation order and Q=4, and wherein to determine the SBF for each of the Q number of bits per symbol associated with the first modulation order based on the SNR associated with the base symbol associated with the base modulation order, the control system is adapted to determine a first bit of the Q number of bits per symbol has a SBF of about 1/10, a second bit of the Q number of bits per symbol has a SBF of about 1/10, a third bit of the Q number of bits per symbol has a SBF of about 1/10, and a fourth bit of the Q number of bits per symbol has a SBF of about 2/5.

12. A method for determining an effective signal-to-interference-plus-noise ratio (ESINR) associated with transmission of a plurality of modulation symbols at a plurality of different modulation orders in a forward error correction (FEC) block comprising:
   determining a signal-to-interference-plus-noise ratio (SNR) bit factor (SBF) for each of Q number of bits per symbol associated with a first modulation order based on the SNR associated with a base symbol associated with a base modulation order;
   determining a SBF for each of P number of bits per symbol associated with a second modulation order based on the SNR associated with the base symbol, wherein the first modulation order is different from the second modulation order; and
   determining the ESINR for the FEC block based on a plurality of first modulation symbols associated with the first modulation order and a plurality of second modulation symbols associated with the second modulation order based on a first SNR associated with each of the plurality of first modulation symbols, a second SNR associated with each of the plurality of second modulation symbols, and the SBF associated with the Q number of bits per symbol associated with the first modulation order and the P number of bits per symbol associated with the second modulation order;
   wherein determining the ESINR comprises determining the ESINR for the first FEC block substantially in accordance with the following equation:

$$ESINR = -\ln\left(\frac{1}{N}\sum_{k=1}^{L}\sum_{b=1}^{M_k} e^{-SBF_{k,b}\gamma_k}\right),$$

where N is a total number of Q number of bits plus P number of bits for the plurality of modulation symbols, L is a total number of the plurality of modulation symbols, $M_k$ is a number of bits in a $k^{th}$ modulation symbol, $SBF_{k,b}$ is an SBF associated with a $b^{th}$ bit in the $k^{th}$ modulation symbol, and $\gamma_k$ is a SNR of the $k^{th}$ modulation symbol.

13. The method of claim 12 wherein the base symbol is a binary phase shift keying symbol, and the base modulation order is 1.

14. The method of claim 12 wherein the base symbol is a quadrature phase shift keying symbol, and the base modulation order is 2.

15. The method of claim 12 wherein the FEC block is transmitted using a multiple-input and multiple-output (MIMO) transmitter.

* * * * *